(No Model.)
F. C. STARKE & P. J. CROWLEY.
STEAM SHOVEL.
No. 271,939. Patented Feb. 6, 1883.
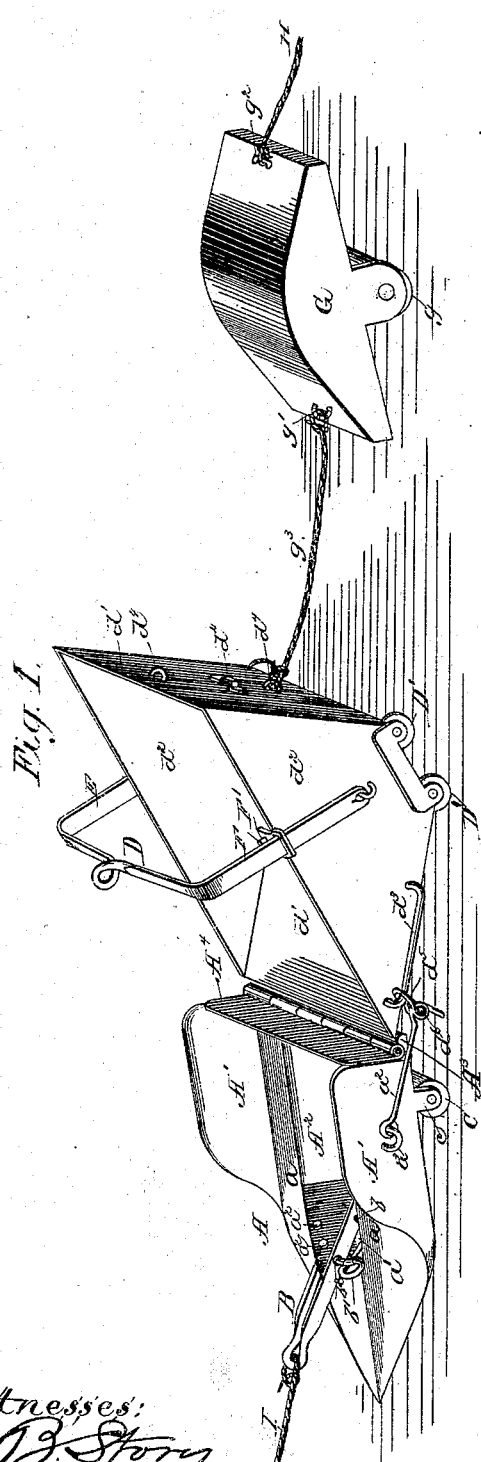
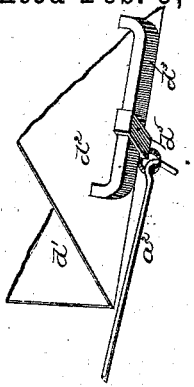
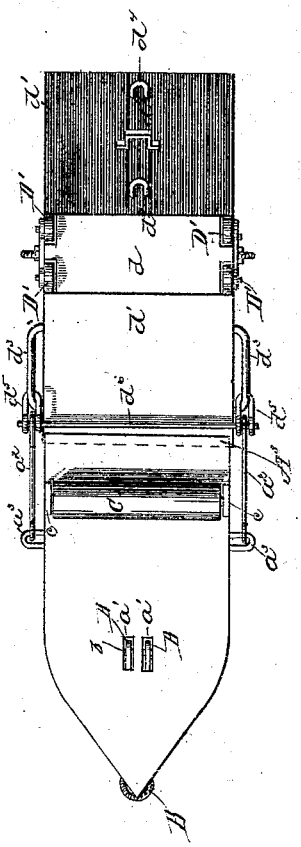
Witnesses:
C. B. Story
Adolph Klein
Inventors:
Fred C. Starke
Peter J. Crowley
By Stout & Underwood
Attorneys

UNITED STATES PATENT OFFICE.

FRED C. STARKE AND PETER J. CROWLEY, OF MILWAUKEE, WISCONSIN.

STEAM-SHOVEL.

SPECIFICATION forming part of Letters Patent No. 271,939, dated February 6, 1883.

Application filed November 23, 1882. (No model.)

*To all whom it may concern:*

Be it known that we, FRED C. STARKE and PETER J. CROWLEY, both of Milwaukee, in the county of Milwaukee, and in the State of Wisconsin, have invented certain new and useful Improvements in Steam-Shovels; and we do hereby declare that the following is a full, clear, and exact description thereof.

Our invention relates to shovels actuated by steam or other power; and it consists chiefly in improvements on the devices patented to us on the 5th of September, 1882, numbered 263,986, all as will be more particularly set forth hereinafter.

In the drawings, Figure 1 represents in perspective our entire improved device. Fig. 2 is a bottom view of our improved shovel and bucket, and Fig. 3 is a detail view of a modified form of attachment of the parts last named.

A is the shovel proper, made as in our prior patent with flat bottom and with side flanges, $A'$ $A'$, and a central flange or ridge, $A^2$; but this central flange, $A^2$, instead of being higher than the side flanges, as heretofore, we now make considerably lower than the flanges $A'$, while between all these flanges are the passages or gutters $a$ $a$.

B is the bail of the shovel, and its arms pass down on each side of the central flange, $A^2$, through holes $a'$ $a'$ in the gutters $a$ $a$; but instead of being solidly united within a countersunk groove, as before, we now prefer to perforate the bifurcated ends of said bail, and journal them upon a pivot, $b$, extending across both holes $a'$ $a'$, as shown. Our central ridge, which is of generally tapering form, widest at the base, is cut away at this point, so as to have vertical sides, and near its top we provide a row of holes, $a^2$ $a^2$; and we provide our bail with corresponding holes, $b^2$, and employ a pin, $b'$, so that we may vary the angle of inclination of our said bail and adjust it rigidly to any inclination required.

As stated in our prior patent, for use in mines or on the surface of the earth, a wholly smooth bottom for the shovel is best; but for use upon a floor or the deck of a vessel or elsewhere where there may be inequalities of surface it will prove advantageous to add a roller beneath the rear end of our shovel. This roller C is journaled in lugs $c$ $c$, and may be located either partly within a transverse groove, as in our patent named, or be wholly below the bottom surface of the shovel, as desired.

We provide our improved shovel with a backward-extending shelf, $A^3$, projecting beyond the rear edge of the flanges $A'$ $A'$ $A^2$, and along the inner edge of this shelf (which is integral with the bottom of the shovel, but of less depth or thickness, and which tapers off to a thin outer edge) we hinge a flap or apron, $A^4$, which in its normal upright position, when the shovel is empty, closes the rear of said shovel, as shown in Fig. 1, rising preferably to about the height of the central flange, $A^2$.

On each side of the shovel there are attached to the outer sides of the flanges $A'$ $A'$ loops or staples $a^3$ $a^3$; but these are placed farther forward than in our said patent, and should preferably be located forward of the vertical line of the roller C, so as to insure the downward pitch of the point of our shovel when power is applied to the bail B to draw it forward. These staples are for connection with our bucket or receiver D, to be next described. This bucket, like that already patented, consists principally of a narrow transverse oblong bottom, $d$, flaring ends $d'$ $d'$, and vertical sides $d^2$ $d^2$. It has also the central upright row of loops or staples, $d^4$ $d^4$ $d^4$, attached to the rear flaring end piece, $d'$, and the hoisting-bail E, locking-pin F, and locking plate or link F', all as described in said patent, and preferably similar rollers D' D'. Our manner of attachment of bucket and shovel, however, is entirely different from our patented device. In place of the simple loops or staples $d^3$ shown in said patent, we now form long loops $d^3$, either round, as shown in Figs. 1 and 2, or flat, as in Fig. 3; and in place of the short chains and hooks $a^2$ shown in our patent, we now substitute stiff rods $a^2$, secured to the loops $a^3$ of our shovel, and having hooks at their opposite ends for connection with the bucket. When the long loops $d^3$ are round we have found it advantageous to suspend links $d^5$ from each of the said long loops and to connect these links together by a long rod, $d^6$, to keep the said links always in position to receive the hooked ends of the rods $a^2$; but the same effect can be secured by substituting square or flat metal for round in the construction of the long loops $d^3$, and then, dispensing with the rod $d^6$, provide sliding blocks, with rings or staples at their bases, in place of the links $d^5$, as shown in the detail view, Fig. 3.

Our present device may be used either with or without a governor, G; but we have here shown one of the same general construction as that in the patent named, having roller $g$ and loops or shaft $g'$ and $g^2$ at front and rear, respectively, the former being for the attachment of said governor by chain or cable $g^3$ to the bucket, and the latter to receive the end of the rear power-cable, H. When the governor is dispensed with, the said power-cable would be attached to one of the rear loops $d^4$ of the bucket D in place of the cable $g^3$, as shown in the drawings, while the front power-cable, I, is always to be attached to the loop in the draft-bail B of the shovel.

When our device is to be pulled forward into the mass of coal, ore, or other material, the bucket and shovel are connected together in the manner and relative positions shown in Fig. 1, with the apron $A^4$ closing the rear end of our shovel, and with the forward end, $d'$, of our bucket resting securely upon the shelf $A^3$; but as the shovel receives its load and continues to advance, its contents will thereby become transferred into the bucket, this action automatically forcing down the apron $A^4$ on the shovel within the bucket, thus effectually covering the point of connection of these two parts and preventing any of the coal, ore, or other materials from dropping down between them, and thereby interfering with the successful operation of our device.

With our patented device, when we employed short chains or links $a^2$ and connected the hooks at the ends of said chains with the short loops or staples $d^3$ at the extreme ends of the sides of our bucket, as shown in said patent, it was necessary to tip up our bucket by hand, so that it rested on its forward end, $d'$, in order to connect it with the shovel; but by means of our present long loop $d^3$ this is unnecessary, and our hooked rods $a^2$ can now be readily connected with the links $d^5$, (shown in Figs. 1 and 2,) or with the corresponding rings in the sliding blocks $d^5$, (shown in Fig. 3,) without altering the position of our bucket at all; and hence it is quite immaterial whether the bucket is resting on its bottom (in which case the links or sliding blocks $d^5$ would be at the extreme right-hand ends or lowest parts of the long loops $d^3$) or tilted forward, as shown in Fig. 1, (when the said links or blocks would be at the extreme left-hand ends or highest parts of said long loops,) or anywhere between, so far as the attachment is concerned, which is almost instantaneous, and then the links or blocks will slide forward along the long loops as power is applied to the cable I, and as the shovel is pulled forward the bucket is automatically pulled down until its forward end rests on the described shelf $A^3$ of the shovel, exactly as shown in Fig. 1, and, as our bucket (being made of boiler-iron) is exceedingly heavy, this feature is of great value in the saving of time and labor in the mere coupling of these two parts alone.

We have found that by making the central flange, $A^2$, higher than the side flanges, $A'$ $A'$, as in our patent, there was a tending to spill the contents of the shovel over the sides; and hence we now make the said central flange lower than the others; and in fact we find that we may practically dispense with this central flange from a point just back of the bail attachment without interfering with the successful operation of our shovel; but where it is employed it is necessary that it should be made lower than the others to guard against the danger of spilling, above referred to; and hence we may sometimes dispense altogether with our central flange and attach the bail B to the side flanges, (by perforations and pins,) although we prefer the arrangement shown.

Having thus described our invention, what we claim as new, and desire to secure by Letters Patent, is—

1. A steam-shovel having flat bottom and side flanges and a low central flange for the attachment of a bail and rear projecting shelf, substantially as set forth.

2. A steam-shovel having flat bottom and upright flanges, a bail for attachment of a power-cable, a rear projecting shelf, and a hinged apron for closing the rear of said shovel, substantially as set forth.

3. A steam-shovel having flat bottom and side flanges, and a low central flange provided with holes $a^2 a^2$, a draft-bail pivoted in slots in the bottom of the shovel and adapted to straddle the central flange, and having holes corresponding to the holes in said flange, and a locking-pier, whereby the inclination of the bail may be adjusted at will and fixed in said inclination, substantially as set forth.

4. A steam-shovel having flat bottom and upright flanges, an adjustable draft-bail and a roller placed underneath the rear end, and staples $a^3 a^3$, placed forward of the vertical line of the roller, whereby the downward pitch of the point of the said shovel is secured when it is attached to a receiver or bucket, substantially as set forth.

5. The bucket or receiver D, having flat oblong transverse bottom, flaring ends, and straight sides, provided along their forward lower parts with the long loops or staples $d^3$, and links or sliding blocks $d^5$, for the attachment of a steam-shovel, irrespective of the position of the bucket, substantially as set forth.

6. The combination of the shovel A, having flat bottom and upright flanges, adjustable draft-bail B, shelf $A^3$, and hinged apron $A^4$, staples $a^3 a^3$, and hooked rods $a^2 a^2$, with the bucket D, having long loops $d^3 d^3$, and links or sliding blocks $d^5 d^5$, substantially as shown and described, and for the purpose set forth.

In testimony that we claim the foregoing we have hereunto set our hands, on this 13th day of November, 1882, in the presence of two witnesses.

FRED C. STARKE.
PETER J. CROWLEY.

Witnesses:
STANLEY S. STOUT,
H. G. UNDERWOOD.